Aug. 30, 1960   J. R. HUBER   2,950,691
NET EQUIPMENT FOR OPEN RACK VEHICLES
Filed June 10, 1958   6 Sheets-Sheet 1
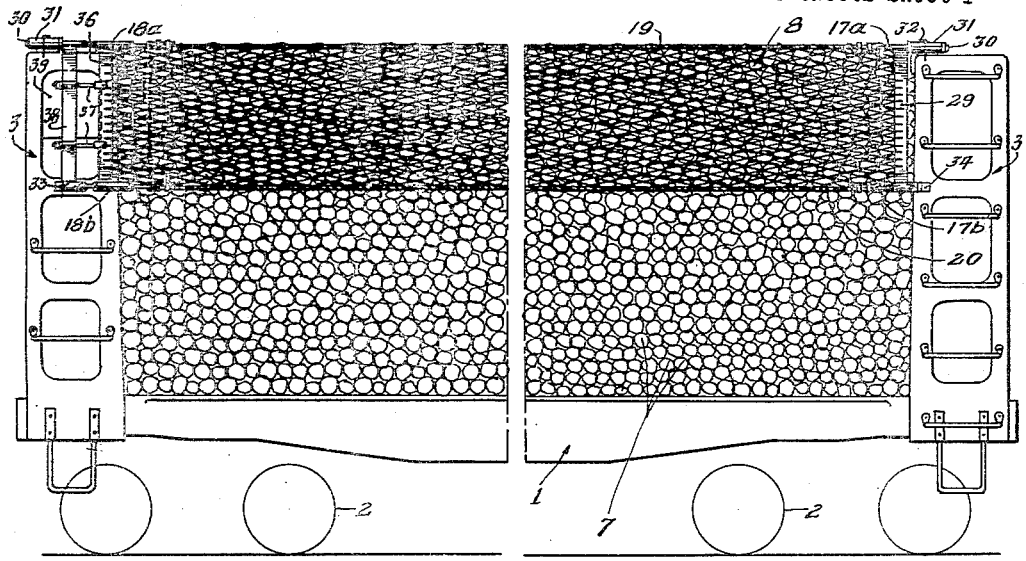
Fig. 1.
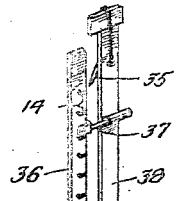
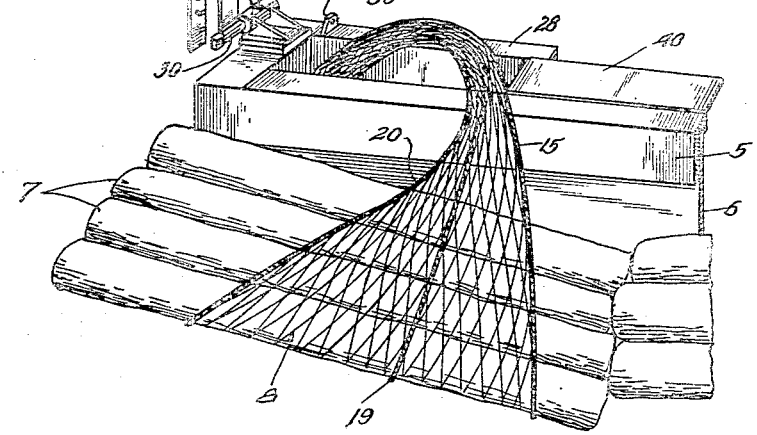
Fig. 6.
INVENTOR
John Richard Huber
Harris S. Campbell
ATTORNEY

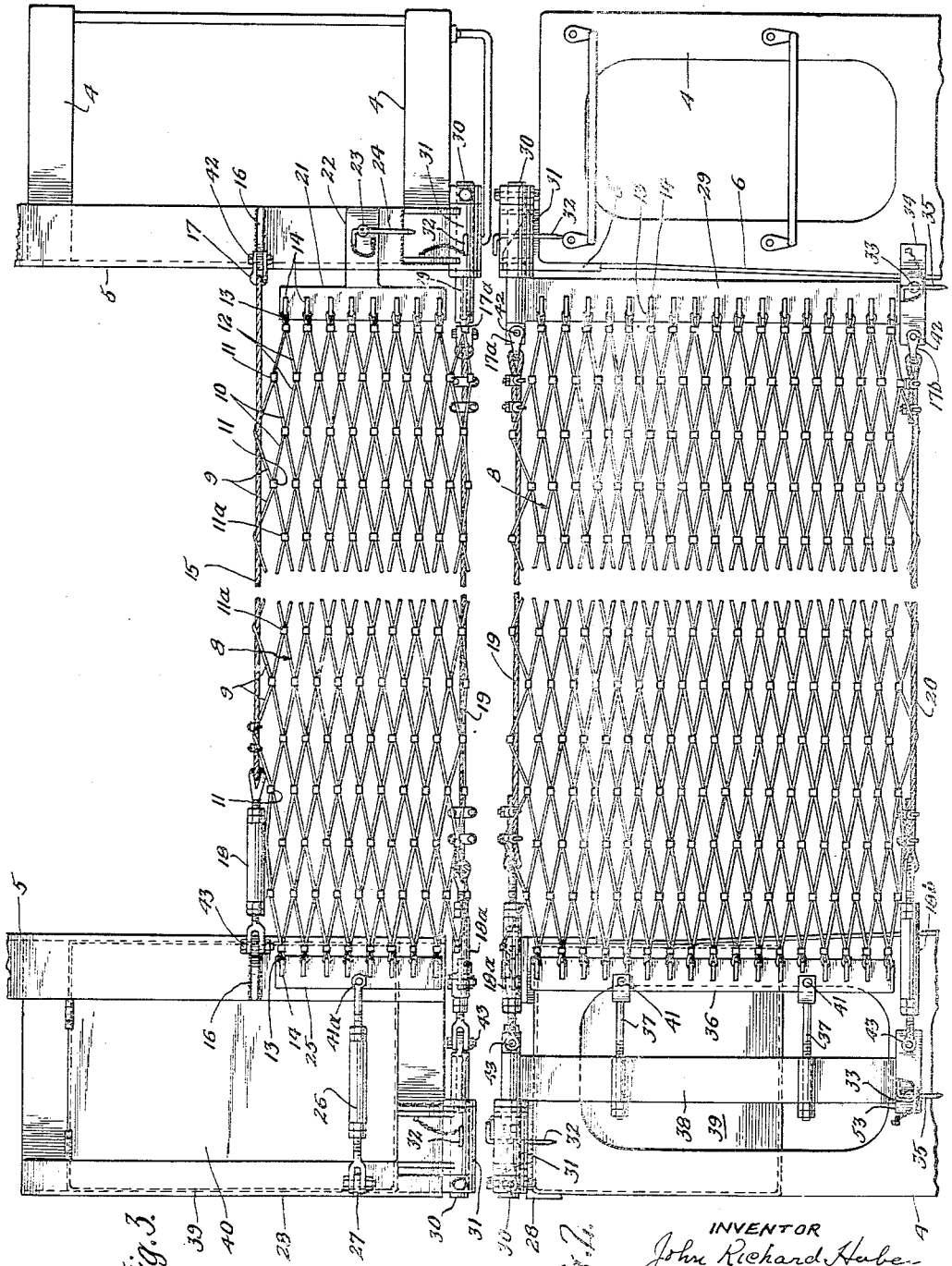

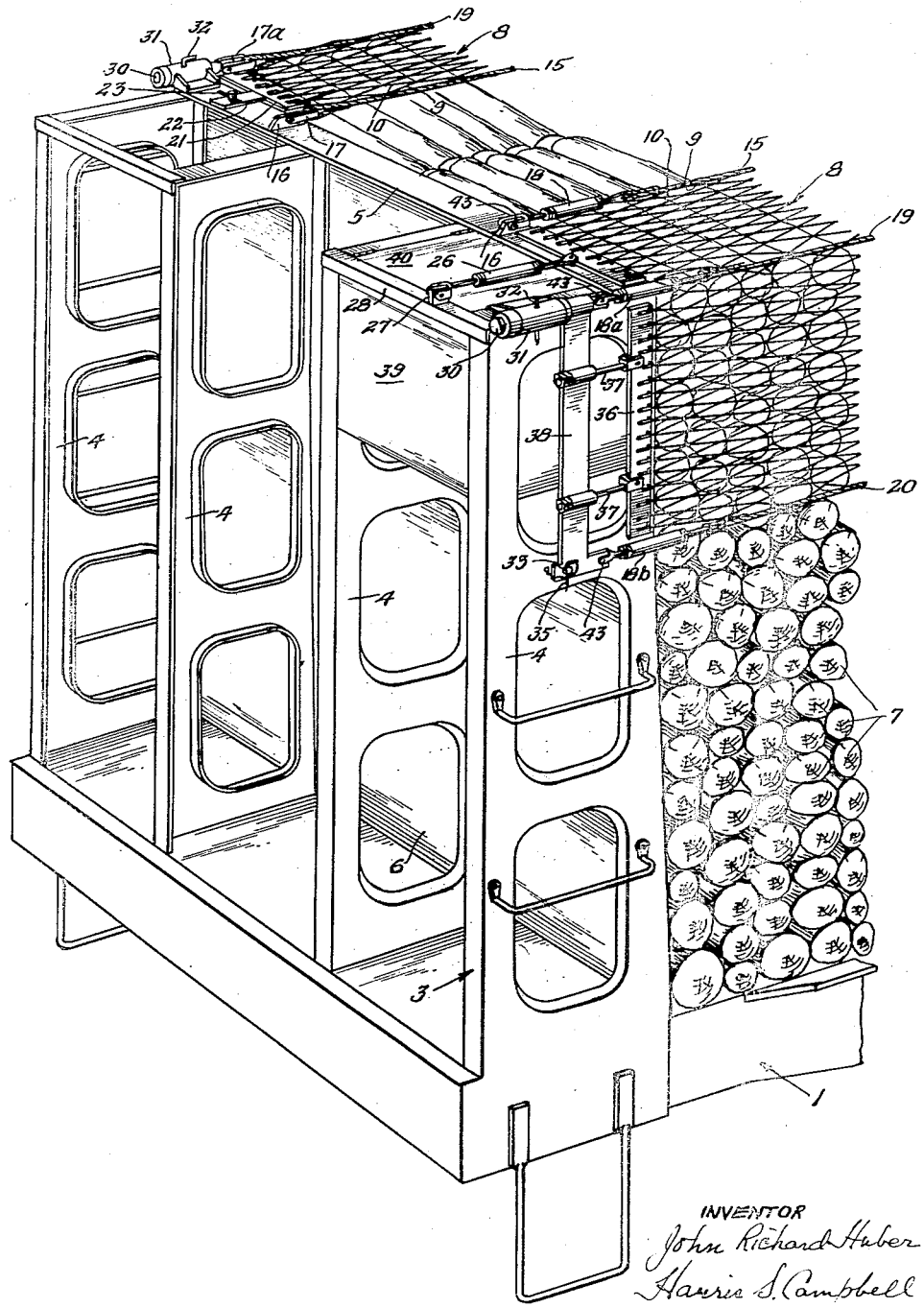

Aug. 30, 1960 J. R. HUBER 2,950,691
NET EQUIPMENT FOR OPEN RACK VEHICLES
Filed June 10, 1958 6 Sheets-Sheet 4

INVENTOR
John Richard Huber
Harris S. Campbell
ATTORNEY

Aug. 30, 1960  J. R. HUBER  2,950,691
NET EQUIPMENT FOR OPEN RACK VEHICLES
Filed June 10, 1958  6 Sheets-Sheet 5
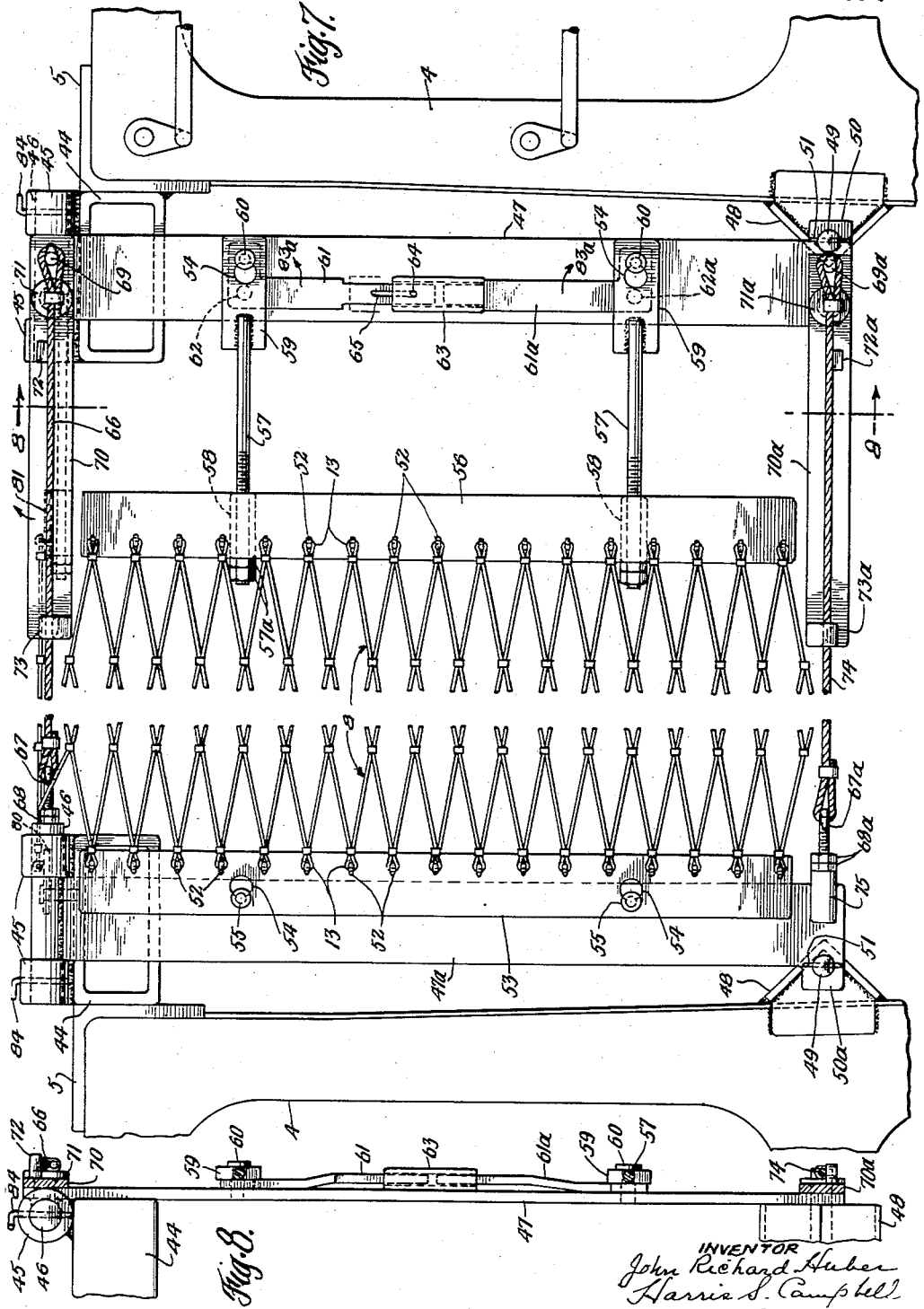
INVENTOR
John Richard Huber
Harris S. Campbell
ATTORNEY

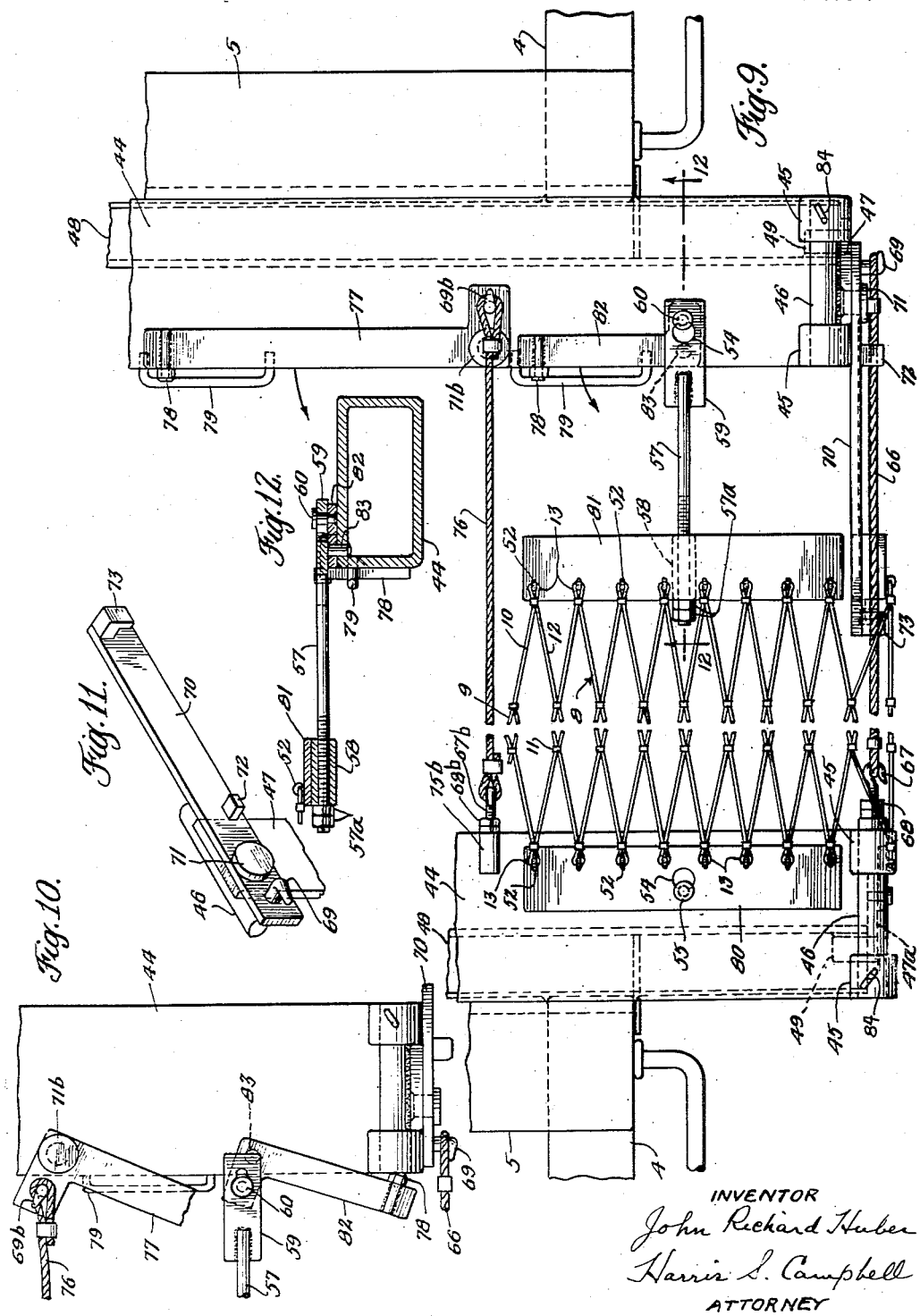

United States Patent Office 2,950,691
Patented Aug. 30, 1960

2,950,691
NET EQUIPMENT FOR OPEN RACK VEHICLES

John Richard Huber, Holicong, Pa., assignor to Eastern Rotorcraft Corporation, Doylestown, Pa., a corporation of Pennsylvania Filed June 10, 1958, Ser. No. 741,178

15 Claims. (Cl. 105—369)

This invention relates to load securing equipment for vehicles which carry their loads in open racks, such as railroad pulpwood cars, and is particularly concerned with load retention nets and mounting equipment therefor.

In order to provide for rapid loading and unloading of such materials as pulpwood this is preferably transported on open rack vehicles such as railroad cars. These vehicles have end supports for the load but the sides and top are open. Pulpwood logs are usually cut in relatively short lengths, approximately four to five feet. Thus two piles of pulpwood may be carried on the width of the car. The open sides allow rapid loading either by manual labor or with special loading equipment. Unloading is also easy since the complete load of pulpwood may be displaced with a mechanical ram to push the load off into a flume or conveyor.

The time and labor required to load or unload the open rack railroad car is only a small fraction of that required to load or unload a standard boxcar. However since pulpwood is often slippery when wet sudden jolts have a tendency to shift the load and the swaying motion of the car on curves and rough tracks can cause displacement of individual logs or spill a portion of the load. As a result open rack loads have been restricted to single track railroad lines because of the danger to traffic on the adjacent line of double track roads. On double track railroads closed boxcars have heretofore been used for the transport of pulpwood with resultant increase in cost.

It has been found by test operations that it is the upper part of the load which moves. The lower portion of the load is retained in position by the upper portion. Thus if the upper portion of the load is retained against shifting, spillage during transportation is eliminated. It is an object of the present invention to provide special net equipment to prevent the lateral movement of logs in the upper part of the load, the size of the mesh being made to prevent a log from passing through.

Another object of the invention is to provide a special net construction which can be readily folded for compact storage while at the same time providing for rapid application or removal of the net at the loading or unloading location. Compact storage of the net is desirable in order to permit easy transportation with the car during the return trip when the car is empty.

Another object of the invention is the provision of supporting and adjusting equipment for holding the net in correct position in a manner which permits the rapid attachment or removal of the net equipment.

A further object of the invention is the provision of simple tensioning mechanism for adjusting both the net supporting members and the net itself. Included in this object is the provision of structure which is sufficiently simple that it may be applied or removed by workers without special training.

In order to assist in the effective application and removal of the equipment a specific object of the invention is to provide vertical end supporting members which may be swung upwardly into a position where the netting may be easily attached or disconnected while the operators are on top of the load.

Another specific object of the invention is the provision of fast acting tightening mechanism both for the longitudinal tension supporting members and for the net structure. This mechanism involves terminal members constructed to be quickly engaged with an anchor stud, the tensioning being accomplished by levers which may be rotated to perform a toggle action to give rapid tightening of the structure and net.

How these and other objects and advantages of the invention are accomplished will be evident from the following description of the drawings in which—

Figure 1 is a foreshortened side elevational view of a railroad car showing a general view of the equipment of the present invention attached thereto.

Figure 2 is a side elevational view to an enlarged scale of the net and its attaching structure.

Figure 3 is a plan view of the end portions of the net and its attachment to the end structure of the railroad car.

Figure 4 is a perspective view of one end of the car structure showing the net equipment in position.

Figure 6 is a perspective view in the same general direction as Figure 5 but showing the net removed and being stowed in partially collapsed position.

Figure 7 is a side elevational view of the end portions of a modified form of net structure showing its attachment to the railroad car.

Figure 8 is a sectional view taken in the direction of arrows 8—8 Figure 7.

Figure 9 is a plan view of the net equipment of Figure 7.

Figure 10 is a plan view of the levers shown in Figure 9 rotated to release position.

Figure 11 is a perspective view of one of the tightening levers shown in Figure 7.

Figure 12 is a sectional view taken in the direction of arrows 12—12 Figure 9.

Figure 5:
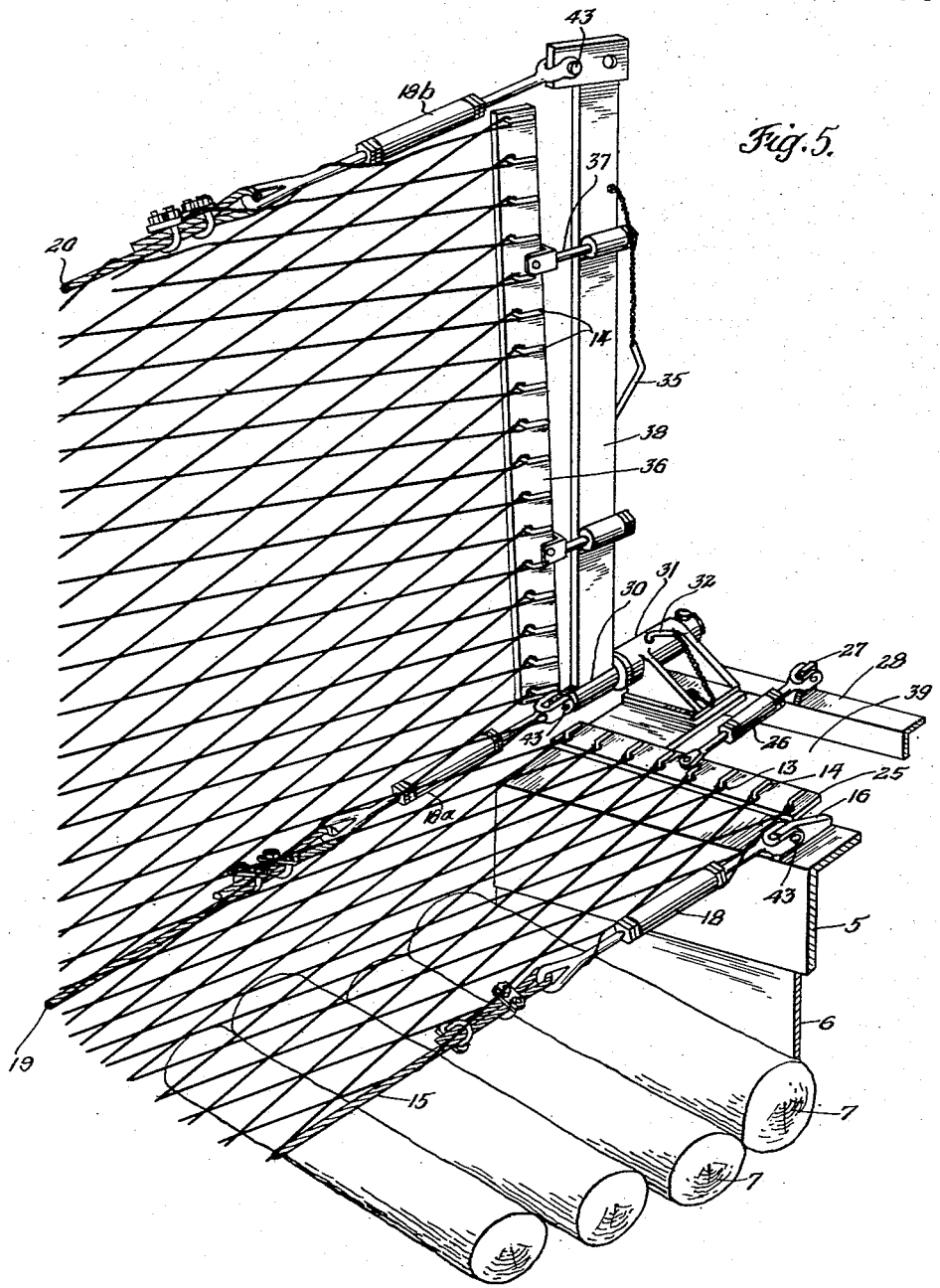
Figure 5 is a perspective view of the end portion of the net structure with the end support rotated around to a raised position.

Figure 1 shows a general view of an open rack railroad car with the securing equipment of the present invention applied to it. The details of the net equipment will be clear by reference to Figures 1 to 5. The frame of the car is indicated at 1, the car wheels 2 being illustrated diagrammatically. End structures 3—3 are rigidly connected to the frame 1 and act as the vertical supports for constraining a load against endwise displacement. Each end structure 3 includes four separate vertical frame members 4, see Figure 4, with a corner structural member 5 at the upper corner and a vertical wall plate 6.

Open rack cars of the type shown are used chiefly for transporting pulpwood in the form of logs 7 which are usually cut to lengths so that two logs may be accommodated in the width of the car. A shallow depression is normally provided between the side frames 1 of the car so that the outer ends of the logs 7 are elevated slightly to assist in stabilizing their position. When wet these logs are slippery with the result that they sometimes shift their position under violent movements of the car such as when shunting or riding over rough track and curves. The net device 8 is applied to the upper portion of the load since it has been found that retaining this portion of the load in position adequately anchors the remainder of the load. The net device 8 is preferably fabricated from metal cable to form diamond shaped meshes by longitudinal runs of cable. Referring to Figures 3 and 4 it will be seen that an edge run 9 extends longitudinally of the net in zig-zag relationship. An adjacent run 10 also lies in zig-zag relationship alongside run 9 to which it is fastened by fittings 11. Another longitudinal run of cable 12 connects with run 10 at alternate mesh points by fittings 11a. At each end of runs 10 and 12 a loop 13 is formed in the cable member in order to provide a convenient connection for engaging the terminal hook 14. Additional runs of cable similar to 10 and 12 are used to complete the net with loops 13 engaging the end anchor hooks 14 to form the complete net 8 which, as illustrated herein, extends over a portion of the upper corner of the load and downwardly over the upper portion of the side of the load.

In order to support the net device in this position a tension member illustrated as heavy cable 15 extends longitudinally between fittings 16 attached to the structural members 5. At one end a shackle 17 connects the cable 15 to the fitting 16 and at the other end a turnbuckle device 18 is used to provide tensioning of the supporting cable member 15. In the same general fashion the corner supporting cable 19 is attached to the anchoring structure by shackle 17a and at the other end by turnbuckle 18a. Similarly the lower side supporting cable 20 is connected by shackle 17b and turnbuckle 18b.

In order to provide rapid assembly of the net unit on the car special connecting structure is provided. The upper or horizontally disposed portion of the net between cables 15 and 19 is mounted with its loops 13 connected to the anchor hooks 14 which in turn are attached to a bar member 21 which has an extension 22 connected to the corner structural member 5 by an anchor stud 23, a wire locking pin 24 being provided for rapid attachment. At the opposite end of the horizontal portion of the net from the bar 21 it is similarly attached to a bar 25 which in turn is anchored by a turnbuckle 26 connected to a fitting 27 attached to a structural member 28. To support the vertical portion of the net between the supporting cables 19 and 20 one end of the net is attached by means of the anchor hooks 14 to a bar member 29. The upper end of the bar 29 is provided with a pivot 30 which extends inside cylindrical bearing member 31 attached to the corner of the vertical structure 4. A quick release locking pin 32 extends through suitable apertures in bearing 31 and pivot 30 to lock the bar 29 either in the position shown in Figure 2, or raised approximately 180 degrees to an upright position as shown in Figure 5. The lower end of bar 29 is arranged to be anchored in the down position as in Figure 2 by means of an anchor stud 33 attached to fitting 34 which is connected to the structural member 4. Another locking pin 35 provides for quick attachment or release of the lower end of the bar. The opposite end of the vertical net portion is anchored to bar 36 which in turn is connected by threaded rod members 37 to a parallel vertical bar 38. The upper end of bar 38 is attached to the structure by means of mechanism similar to that for bar 29 including the pivot 30 and bearing 31. Likewise the lower end of the bar 38 is connected to the structural member 4 by means of an anchor stud 33 and a locking pin 35.

It will be noted that at the end of the car at which the tightening adjustment of the net is located a storage box 39 having a hinged lid 40 is provided. To remove the net equipment from the car the turnbuckles 18, 18a, 18b and 26 and the rods 37 are relaxed to remove the tension from the supporting cables and the net. The lower ends of the bars 29 and 38 may then be disconnected by removing the locking pins 35 and after removing the upper locking pins 32 the bars 29 and 38 may be swung into upright position as illustrated in Figure 5 when the locking pins 32 are replaced to hold the bars upright.

In the relaxed position the net may be removed from the supporting bars by first disconnecting the bar 21 from its anchor stud 23 and bar 36 from rods 37 by removal of pins 41. The net may then be unhooked from the bars 25 and 29. The supporting cables 15, 19 and 20 are then disconnected by removing the pins 42 from shackles 17, 17a and 17b and pins 43 from turnbuckles 18, 18a and 18b. The net assembly with the cables 15, 19 and 20 attached may then be collapsed and coiled in a fashion to permit stowing in the box 39 as will be clear by reference to Figure 6. The supporting bars 21, 25 and 36 and other removable parts are also stored in the box 39 and the end supporting bars 29 and 38 are swung down to their vertical position and secured in place by locking pins 32 and 35. As will be clear from the drawings both sides of the car are equipped with a net structure such as described above. The two sets of nets are normally removed preparatory to unloading the pulpwood from the car. The net equipment is stored in the manner described above until the car has been returned and reloaded with pulpwood.

The application of the net is generally the reverse of the procedure outlined above for removal. The bars 29 and 38 are swung to the raised position and the net equipment removed from the box. The net is then hooked to the end supporting bars and the bars 21, 25 and 36 set in their proper positions on the anchor pins 23, 41a and 41. The cables 15, 19 and 20 are attached at each end to their respective fittings after which the bars 29 and 38 are swung down and locked on their studs 33 in operating position. The net is then tightened in position by first tightening the cable turnbuckles 18, 18a and 18b and then tightening the net adjustment turnbuckle 26 and the adjustment rods 37.

Figures 7 to 9 show a somewhat different method of attaching the net and its supporting cables to the car. This structure is of particular value when it is desired to mount the side nets outwardly from the car end frame members 4 such as when using the equipment with pulpwood which projects beyond the side frame of the car. From these figures it will be seen that a heavy upper cross member 44 is rigidly attached such as by welding to the upper corner structural member 5 and projects the desired distance beyond the upright frames 4 at each end of the car. Attached at each end of the cross member 44 are double bearing parts 45 which carry a pivot rod 46. At one end of the car attached to the pivot rod 46 is a bar member 47 and at the other end attached to the pivot rod 46 is a bar member 47a. Supported transversely of the car on the vertical structural frames 4 in line with the lower ends of bars 47 and 47a is a beam member 48 which extends beyond the frame members 4 approximately the same distance as the cross members 44. Each beam member 48 supports at its end an anchor stud 49 which engages a lug 50 or 50a as the case may be to support the lower ends of bar members 47 and 47a against the tensioning load. A small locking wire part 51 holds each lug 50 or 50a in secured position on the anchor stud 49.

As will be seen in Figures 7 and 8 the net device 8 is secured at one end by means of its end loops 13 to suitable anchor fittings 52 which are attached to a bar 53. Keyhole slots 54 are provided in the bar 53 to engage the button-headed studs 55 which are anchored to the bar member 47a. This provides a fast mounting attachment for connecting bar 53 to bar 47a.

At the other end of the upright portion of the net device 8 the end loops 13 are attached to the anchor fittings 52 which are attached to an adjustable bar 56. Threaded rod members 57 extend to cylindrical fittings 58 attached to the bar 56. Terminal fittings 59 incorporate keyhole slots 54 to provide for anchoring the rods 57. The slots in terminals 59 engage the headed studs 60 attached to an upper swingable lever 61 and a lower swingable lever 61a. The upper lever 61 is connected to the bar 47 by a pivot 62 and the lower lever by pivot 62a. In the full line position lever 61 is shown with the hollow sliding portion 63 engaging the upper end of the lever 61a. Sliding portion 63 is attached to the upper lever 61 by means of a pin 64 which works in a slot 65 to limit the motion of the sliding portion 63. With the sliding portion in the position shown in Figure 7 the levers 61 and 61a are held in operative position.

A corner cable 66 is supported at the upper end of bar 47a by means of a threaded hook 67 which is threaded into the pivot cylinder 46 and locked in position by nuts 68. The other end of the cable 66 is held by a hooked stud member 69 which as fastened near the end of lever 70. A shallow headed pivot member 71 supports the lever 70 on the bar 47. In the position shown in Figure 7 the lever 70 is in tightened position with the hooked stud 69 to the right of the pivot member 71. In this position a projection 72 extending from the lever 70 engages the upper side of the cable 66 and another projection 73 with a bent over hook portion engages the lower side of the cable 66, the hook portion preventing the cable from jumping over the projection 73.

The lower cable 74 extends from the lower threaded hook 67a which engages the cylindrical member 75 attached to the bottom end of bar 47a. The other end of cable 74 is connected to the lower end of bar 47 by means of the lever 70a constructed and mounted similarly to the lever 70 described above. Thus the cable connects to the hooked stud 69a and the lever 70a is supported on pivot 71a and retained in position on the cable by projections 72a and 73a.

The manner of supporting the horizontal portion of the net 8 is shown in Figures 9, 10 and 12. The inboard tension member 76 is anchored to the end cross member 44 by the adjustable hook 67b which extends into the cylindrical part 75b, the position of adjustment being retained by the nut 68b. The other end of tension member 76 is anchored to the hooked stud 69b which in turn is fastened to the lever 77 attached to the cross member 44 by means of the pivot member 71b. In the position shown in Figure 9 the tension member 76 is in tightened position and the terminal hook 69b lies over-center with the lever 77 extending along the edge of member 44 and being retained in this position by a pivoted stop 78 which can swing down between a bar 79 and the cross member 44 to position the lever 77 against movement in either direction.

At one end of the net 8 the loops 13 of the horizontal portion are attached to anchor fittings 52 mounted on a bar member 80 which is attachable to the end cross member 44 by means of the keyhole opening 54 and the headed stud 55. The other end of the net 8 is similarly attached by fittings 52 to a bar 81, a threaded adjustment rod 57 extending through cylindrical member 58 attached to a bar 81. Nuts 57a provide for the length adjustment of the rod 57. The terminal fitting 59 connects rod 57 to a headed stud 60 by the keyhole opening 54. The headed stud 60 is attached to a lever 82 which has pivot 83 connecting it to the member 44. The lever 82 is held in operative position by the pivoted stop 78 which swings down into position between the rod 79 and member 44 to retain it in a fashion similar to that for lever 77. Figure 12 illustrates the relationship of the parts connecting the bar 81 to the cross member 44.

When the net equipment shown in Figures 7, 8 and 9 is applied for the first time to a vehicle the adjustable hooks 67, 67a and 67b are adjusted to give the proper length of cable so that when the fast acting toggle levers 70, 70a and 77 are operated they provide the correct tensioning for the tension members 66, 74 and 76. The hooks 67, 67a and 67b are then locked by the jam nuts 68. Likewise the initial adjustment of the net 8 is accomplished by adjusting the nuts 57a on the rods 57 until the correct tensioning is accomplished with the levers 61, 61a and 82 in the tightened position. Subsequent tightening operations are accomplished by means of the levers only.

To remove the net equipment shown in Figures 7, 8 and 9 the net tension is relaxed by first releasing the pivoted stop 78 to permit swinging the lever 82 in the direction of the arrow, Figure 9, until it passes under the rod 57 and reaches a position such as shown in Figure 10. In this position the net is sufficiently slack that the fitting 59 may be moved slightly to permit removal of the fitting from the headed stud 60. The side portion of the net may be also relaxed by sliding the collar 63 up on the lever 61 until it clears the end of lever 61a when both the levers 61 and 61a may be swung in the direction of arrows 83a, Figure 7, until the levers are rotated approximately 180 degrees permitting enough slack to remove the fittings 59 from studs 60. The tension is then released from the supporting tension members by first unlocking the end of lever 77 and swinging it in the direction of the arrow, Figure 9, to the position shown in Figure 10. The lever 70 is then released by unhooking the bent projection 73 from the cable 66. The lever is then swung through 180 degrees to the release position as illustrated in Figures 10 and 11. In like manner tension is released in tension member 74 by swinging lever 70a. With the cables and net relaxed the upright bars 47 and 47a may be unlatched from their anchor studs 49 and swung to upright position where they can be retained by the retaining rods 84 located in pivot bearing parts 45. The supporting cables can then be unhooked from their terminal hooks and the fittings 59 removed from the studs 60 to unfasten the net unit. The other end of the net is then released by removing the bar members 53 and 80 from the studs 55. With the net parts on top of the load the equipment can be partly collapsed and rolled up for storage in the equipment box.

From the foregoing it will be evident that I have provided lightweight and effective equipment for improving the usefulness of open rack vehicles such as railroad cars. This equipment is particularly effective in connection with the transportation of pulpwood since it assures the retention of the load against dangerous displacement or spillage. At the same time the equipment is easily applied or removed from the vehicle in a few minutes. In this way the added safety is obtained with little increase in cost of loading. With the equipment removed the vehicle is relatively unobstructed so that normal loading and unloading procedures may be used without interference.

I claim:

1. A net system for retaining pulpwood and the like on open rack vehicles having end structures, said system including a pair of longitudinal metal tension elements extending along the upper portion of the vehicle at each side between the end structures, a second pair of tension elements, one supported directly below each of the upper elements, a tensioning device attached to one end of each of said tension elements, a metallic net having a plurality of generally longitudinal mesh elements supported between the upper and lower tension elements at each side and extending substantially the length of the tension elements and anchoring means connected to the ends of said longitudinal mesh elements, said anchoring means being connectible to the end structures.

2. A net system according to claim 1 in which the tensioning device attached to each of said tension elements includes a lever having a pivot and stud located in offset relation to said pivot for attaching to the tension element, said lever being swingable on said pivot to cause an over-center position of said stud to produce the tensioning action.

3. A net system for retaining pulpwood and the like on open rack vehicles having end structures, said system including a pair of longitudinal metal tension elements extending along the upper edge of the vehicle at each side, a second pair of tension elements, one supported directly below each of the upper elements, a tensioning device attached to each of said tension elements, a net fabricated from metal supported between the upper and lower tension elements at each side and extending substantially the length of the tension elements, said net having a multiplicity of generally longitudinally disposed mesh forming elements, a bar member located in one end of each net and incorporating attachment means for connecting said mesh forming elements to said bar member, and tensioning means connected to each of said bar members to apply tension to the mesh elements of the net.

4. A load retention net system for open rack vehicles having end structures including an assembly for the upper corner of the vehicle incorporating at least three longitudinal metal tension elements, anchoring means for attaching each element at each end to the end structure, one of said elements being located near the upper corner of the vehicle, a second of said elements being located vertically below said first element and a third being located horizontally inboard from said first element, a net proportioned to extend longitudinally along the upper corner of the vehicle, said net being supported by said three longitudinal tension elements to restrain the upper portion of a load both against vertical and lateral displacement.

5. A load retention net system for open rack vehicles having end structures including an assembly for the side of the vehicle incorporating at least three longitudinal metal tension elements, anchoring means for attaching each element at each end to the end structure, one of said elements being located near the upper corner of the vehicle a second of said elements being located vertically below said first element and a third being located horizontally inboard from said first element, a net fabricated from metal and proportioned to extend longitudinally along the upper corner of the vehicle, said net having a multiplicity of generally longitudinally disposed mesh forming elements, a bar member having means for connecting to the longitudinal mesh elements of the vertically disposed portion of the net between the first and second tension elements, another bar member having means for connecting to the longitudinal mesh elements of the horizontally disposed portion of the net between the first and third tension elements, each of said bar members having a tensioning device attached thereto to apply tension to the longitudinal mesh elements.

6. A load retention net system for open rack vehicles having end structures including an assembly for the side of the vehicle incorporating at least three longitudinal tension elements, anchoring means for attaching each element at each end to the end structure, one of said elements being located near the upper corner of the vehicle, a second of said elements being located vertically below said first element and a third being located horizontally inboard from said first element, a net proportioned to extend longitudinally along the upper corner of the vehicle, said net being supported by said longitudinal tension elements, the anchoring means at one end of each longitudinal tension element incorporating a tightening device.

7. A load retention net system for open rack vehicles having end structures including for the side a net assembly having an upper longitudinal tension element and a second lower longitudinal tension element located vertically below the upper element, a net extending between each upper and lower elements, a vertical end supporting bar at each end of each net, a pivot connecting the upper end of each of said bars to the end structure, an anchor stud to connect the lower end of each of said bars to the end structure, and attachment means for connecting the ends of each net to said end supporting bars.

8. A load retention net system for open rack vehicles having end structures including for the side a net assembly having an upper longitudinal tension element and a second lower longitudinal tension element located vertically below the upper element, a net extending between each upper and lower elements, a vertical end supporting bar at each end of each net, a pivot connecting the upper end of each of said bars to the end structure, an anchor stud connecting the lower end of each of said bars to the end structure, attachment means for connecting the ends of each net to said end supporting bars, the lower end of each of said bars being detachable from its anchor stud to provide for swinging about its pivot through approximately 180 degrees to an upright position and retention means for holding each bar in the upright position.

9. A load retention net system for open rack vehicles having end structures including for the side a net assembly having an upper longitudinal tension element and a second lower longitudinal tension element located vertically below the upper element, a net fabricated of metal tension members extending between each upper and lower elements, said net having a plurality of generally longitudinal mesh elements, a bar member connected to one end of the longitudinal mesh elements of each net, quick attachment means for anchoring said bar member to the end structure, a second bar member connected to the other end of the longitudinal meshes of each net, and tensioning means connecting said second bar to the end structure.

10. A load retention net system for open rack vehicles having end structures including for one side of the vehicle a net assembly, a plurality of longitudinally disposed tension elements, a net supported at its sides by said longitudinal tension elements, end supports for said net including a bar member to which the end meshes are attached, tensioning mechanism connected to said bar member including a pair of levers, connecting means between said bar and said levers including an attachment stud on each of said levers, each lever being swingable through approximately 180 degrees to bring the anchor studs into an over-center position with respect to said bar, said levers in their tensioned position being in alignment with their ends adjacent to each other, and a sliding part attached to one of said levers, said part being movable to a position engaging the end of the other of said levers to hold them both in tensioned position.

11. A load retention net system for open rack vehicles having end structures, the side of the vehicle having a net assembly, a plurality of longitudinal tension elements for said net assembly, a metal net supported on said longitudinal tension elements, tensioning mechanism for said longitudinal tension elements including an elongated lever, a pivotal support for said lever located near one end, an anchor stud for attaching said tension element, said stud being in line with the lever on the opposite side of the pivotal mounting from the main portion of said lever, a stop member on the side of said lever for engaging one side of said tension element and a hook shaped stop near the end of said lever to engage the other side of said cable to retain said lever in alignment with said tension element when in tensioned position.

12. Load retention equipment for open rack vehicles having end structures, said equipment including three metal tension elements for each side of the vehicle each having a length which is approximately the distance between the opposite end structures, one of said tension elements being supported in position near the upper corners of said end structures, a second tension element supported directly below said first element, the third tension element being supported horizontally inwardly from said first tension element, a metal net supported along an inside portion by said first tension element, the longitudinal edges of said net being supported by said second and third tension elements, a plurality of bar members attached to the ends of said nets and connecting means between said bar members and the end structure of the vehicle.

13. A net system for retaining pulpwood and the like on open rack vehicles having end structures, said system including a pair of longitudinal metal tension elements extending along the upper edge of the vehicle at each side between the end structures, a second pair of tension elements, one supported below each of said upper elements, a quick acting tensioning device having a swingable lever connectible to one end of said tension elements, said lever having a pair of projections for engaging the cable to which it is connected for retaining it in the tensioning position, a metal net supported between the upper and lower tension elements and extending substantially the length of the tension elements, said net having a mesh configuration in which the mesh dimension is greater in the horizontal direction.

14. A net system for retaining pulpwood and the like on open rack vehicles having end structures, said system including a pair of longitudinal metal tension elements extending along the upper edge of the vehicle at each side between the end structures, a second pair of tension elements, one supported below each of said upper elements, a quick acting tensioning device having a swingable lever connectible to one end of said tension elements, each tension element having a threaded adjustment member at its end opposite said quick acting tensioning device, a metal net supported between the upper and lower tension elements and extending substantially the length of the tension elements, said net having a mesh configuration in which the mesh dimensions are greater in the horizontal direction.

15. A net system for retaining pulpwood and the like on open rack vehicles having end structures, said system including a plurality of metal tension elements extended along each side of the vehicle between the end structures, a metal net unit constructed of flexible cable and having elongated diamond shaped meshes extending in the longitudinal direction, each of said nets being supported along its edges by two of said tension elements, each net having a tensioning device connected to the end of each net, said tensioning devices being constructed to transfer the tensioning load to the end structure of the vehicle, said net and tension elements being readily removable and rolled for stowage purposes.

References Cited in the file of this patent

UNITED STATES PATENTS

| | | |
|---|---|---|
| 131,047 | Cremer | Aug. 15, 1876 |
| 1,107,451 | Schroeder | Aug. 18, 1914 |
| 1,123,509 | Forest et al. | Jan. 5, 1915 |
| 2,353,017 | Denton | July 4, 1944 |
| 2,462,309 | Dyke | Feb. 22, 1949 |